Jan. 6, 1942.
F. M. HAINES
2,268,547
REEL HOLDER
Filed March 1, 1941
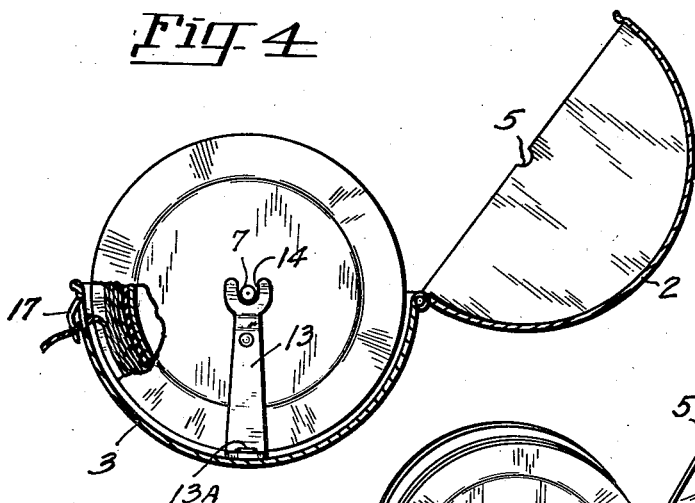
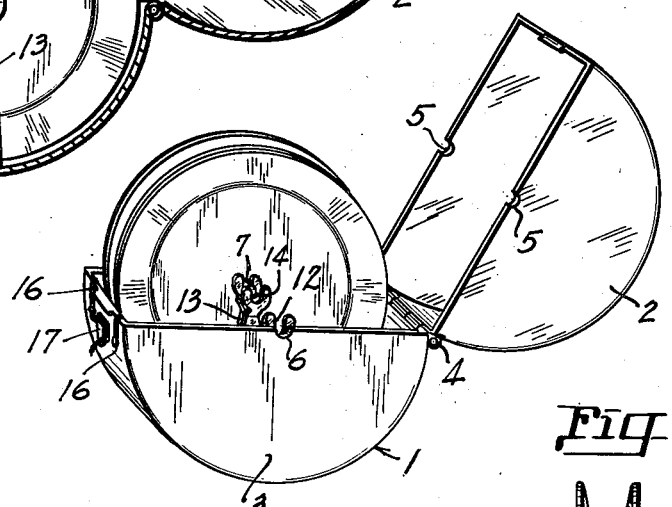
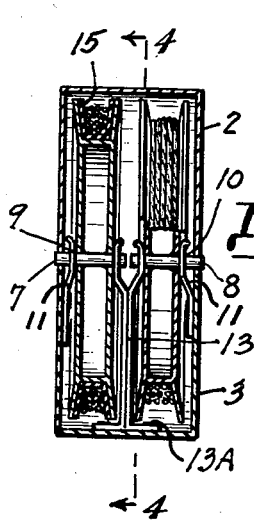
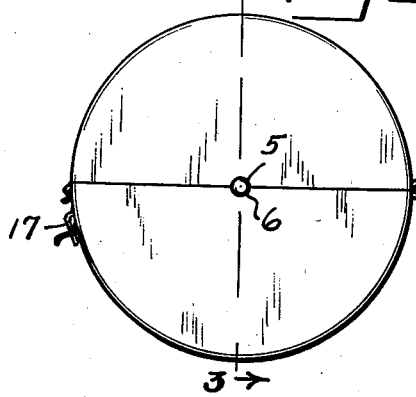
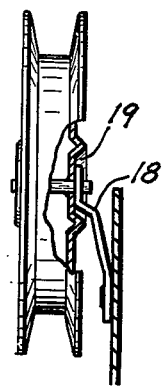
INVENTOR.
FRANK M HAINES
BY
ATTORNEY.

Patented Jan. 6, 1942

2,268,547

UNITED STATES PATENT OFFICE 2,268,547

REEL HOLDER

Frank M. Haines, Milwaukie, Oreg.

Application March 1, 1941, Serial No. 381,321

2 Claims. (Cl. 242—137)

This invention relates to reel holders generally, and more particularly to holders for reels containing fishing leaders.

The principal object of the invention is the provision of a holder of this type which is of simple, compact, light weight, durable construction, and wherein the reels are completely enclosed, and may be conveniently carried in the pocket of the user.

A further object is the provision of means whereby a selection of leaders may be carried and always readily accessible.

A further object is the provision of means for rotatably retaining the reels within the holder and also for applying sufficient tension, or drag, to the reels to prevent the contents thereof from overrunning.

The foregoing and other objects will appear as my invention is more fully hereinafter described in the following specification illustrated in the accompanying drawing and finally pointed out in the appended claims.

In the drawing:

Figure 1 is a side elevation of the reel holder in closed position.

Figure 2 is a perspective view of the reel holder in open position with one of the reels removed.

Figure 3 is a vertical sectional view taken on the line 3—3 of Figure 1.

Figure 4 is a sectional side elevation taken on the line 4—4 of Figure 3.

Figure 5 is a detail view of a combination rotatable support and spring tensioning means for the reels.

Referring now more particularly to the drawing:

Reference numeral 1 indicates the main body of the holder which consists of upper and lower portions 2 and 3, respectively, hinged together as at 4. Both portions are notched at opposite sides, as at 5 and 6, to form outer bearings for the shafts, 7 and 8, of the reels. Each shaft is secured to and made rotatable with its respective reel. In addition to the bearing formed by the notches, 5 and 6, I also provide bearings, 9 and 10, in the form of spring arms 11 bifurcated at their upper ends, as at 12. Each of these arms is biased inwardly into frictional contact with the outer side wall of each reel. For rotatably supporting the inner ends of the shafts, 7 and 8, I provide a vertical bracket 13 spread apart at its upper end, as shown, and each separated end is bifurcated, as at 14, to form the bearings. These separated ends of the bracket 13 are in frictional engagement with the inner walls of the reels by reason of the inward pressure applied to the reels by the spring arms 11. The bracket 13 is secured, as at 13A, to the wall of the lower portion 3 of the holder.

Around the outer periphery of the drum of one reel, and the flanges merging therewith, I provide a lining of any suitable absorbent material, such as felt, and the like, indicated at 15 to serve the purpose of retaining the leader in a moist condition.

At the front end of the lower portion of the holder, I provide slots 16 for extending the ends of the leaders into positions to be conveniently grasped by the user.

Between the slots, I provide any approved form of fastening element such, for instance, as a tongue 17, punched outwardly from the wall of the lower portion for convenience in anchoring the end of the leader.

In the modified illustration in Figure 5, I eliminate the bearing-forming notches, 5 and 6, and rotatably mount the reels and their fixed shafts in spring arms 18 whose upper ends bear against the bottom wall of a circular depression 19 for retaining the reels in a centralized position with respect to the holder and to prevent their unintentional removal.

While I have shown a particular form of embodiment of my invention, I am aware that many minor changes therein will readily suggest themselves to others skilled in the art without departing from the spirit and scope of the invention.

Having thus described my invention, what I claim as new and desire to protect by Letters Patent is:

1. A reel holder comprising two semi-cylindrical portions hinged together, corresponding notches formed in each portion to form aligned bearings, reels mounted upon separate shafts, said shafts being rotatably mounted at their outer ends in said bearings, bearing brackets extending inwardly from a peripheral wall of one of said cylindrical portions and rotatably supporting the inner ends of said shafts, said brackets being in frictional engagement with said reels, and spring arms extending inwardly from the side walls of one of said semi-cylindrical portions and bifurcated at their upper ends to embrace said shafts and arranged in frictional engagement with said reels.

2. A reel holder comprising two semi-cylindrical portions hinged together, corresponding notches formed in each portion to form aligned bearings, reels mounted upon separate shafts, said shafts being rotatably mounted at their outer ends in said bearings, bearing brackets extending inwardly from a peripheral wall of one of said cylindrical portions and rotatably supporting the inner ends of said shafts, said brackets being in frictional engagement with said reels, spring arms extending inwardly from the side walls of one of said semi-cylindrical portions and bifurcated at their upper ends to embrace said shafts and arranged in frictional engagement with said reels, and one of said reels having its peripheral surfaces lined with an absorbent material.

FRANK M. HAINES.